(12) United States Patent
Ying

(10) Patent No.: US 7,543,086 B2
(45) Date of Patent: Jun. 2, 2009

(54) METHOD FOR CONTROLLING UNIVERSAL SERIAL BUS (USB) DEVICE BETWEEN INCOMPATIBLE OPERATING SYSTEM PLATFORMS

(75) Inventor: Han-Hsing Ying, Lujhu Township, Taoyuan County (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 170 days.

(21) Appl. No.: 11/646,726

(22) Filed: Dec. 27, 2006

(65) Prior Publication Data
US 2008/0005375 A1 Jan. 3, 2008

(30) Foreign Application Priority Data
Jul. 5, 2006 (TW) .............................. 95124429 A

(51) Int. Cl.
*G06F 13/00* (2006.01)
*G06F 9/455* (2006.01)

(52) U.S. Cl. .................. 710/14; 710/8; 710/9; 710/10; 710/15; 710/16; 703/23; 703/24; 703/25

(58) Field of Classification Search ............... 710/8–10, 710/14–16; 703/23–25
See application file for complete search history.

(56) References Cited

U.S. PATENT DOCUMENTS

| 7,209,874 B2 * | 4/2007 | Salmonsen .................... 703/23 |
| 2007/0074192 A1 * | 3/2007 | Geisinger ................... 717/148 |
| 2007/0174033 A1 * | 7/2007 | Huang et al. .................. 703/24 |
| 2007/0198244 A1 * | 8/2007 | King et al. .................... 703/27 |

\* cited by examiner

*Primary Examiner*—Tammara Peyton
(74) *Attorney, Agent, or Firm*—Reed Smith LLP; Juan Carlos A. Marquez, Esq.

(57) ABSTRACT

The present invention relates to a method for assisting an application, executed in a processing platform where a first operation system is installed, in controlling a USB device plugged in a second operation system rather than the first operation system. First, under the first operation system, the method is used for receiving a USB request block in a first format, translating the USB request block in the first format into the USB request block in a second format native to the second operation system in accordance with an algorithm, and transmitting the USB request block in the second format out. Next, under the second operation system, the method is used for controlling the USB device in accordance with the USB request block in the second format.

10 Claims, 3 Drawing Sheets

METHOD FOR CONTROLLING UNIVERSAL SERIAL BUS (USB) DEVICE BETWEEN INCOMPATIBLE OPERATING SYSTEM PLATFORMS

BACKGROUND OF THE INVENTION

1. Field of the Invention

The present invention relates to a controlling method for assisting an application in controlling a Universal Serial Bus (USB) device. In particular, the application is executed in a processing platform where a first operation system is installed, but the USB device is plugged in a second operation system rather than the first operation system.

2. Description of the Prior Art

Referring to FIG. 1, FIG. 1 is a functional block diagram showing an essential component for controlling a USB by an application.

As shown in FIG. 1, the application 11 is executed in a processing platform where a first operation system 10 is installed. The USB device 30 is plugged in a second operation system 20 which is identical to the first operation system 10. In FIG. 1, the first operation system 10 and the second operation system 20 use a Windows operation system as an example.

The processing platform includes a USB device driver 12 and a first USB bus driver 13. The USB device driver 12 is coupled to the application 11, whereas the first USB bus driver 13 is coupled to the USB device driver 12. The USB device driver 12 creates, in response to a request from the application 11, a request to set up a USB request block (URB). The first USB bus driver 13 receives the USB request block created by the USB device driver 12 and transmits the USB request block out.

Under the second operation system, a URB receiving driver 21 receives the USB request block transmitted from the first USB bus driver 13. A USB host controlling driver 22, coupled to the USB device 30, is used for receiving the USB request block from the URB receiving driver 21 and for controlling the USB device 30 in accordance with the USB request block.

However, if the first operation system 10 and the second operation system 20 described above are different operation systems, for example, the first operation system 10 is a Windows operation system, and the second operation system 20 is a Linux operation system, the USB request block created in the first operation system 10 is not native in the second operation system 20; thus, the application 11 cannot operate the USB device 30.

Accordingly, the scope of the present invention is to provide a controlling method for assisting an application in controlling a USB device. The application is executed in a processing platform where a first operation system is installed, but the USB device is plugged in a second operation system rather than the first operation system, and the USB request block created in the first operation system is not native to the second operation system. The controlling method according to the invention is to resolve the problems described above.

SUMMARY OF THE INVENTION

A scope of the invention is to provide an agent for assisting an application in controlling a USB device. The application is executed in a processing platform where a first operation system is installed. The USB device is plugged in a second operation system rather than the first operation system. The processing platform includes a USB device driver and a second USB bus driver. The USB device driver is coupled to the application, whereas the second USB bus driver is coupled to the USB device driver. The USB device driver creates, in response to a request from the application, a USB request block in a first format. The second USB bus driver receives the USB request block in the first format from the USB device driver and transmits the USB request block in the first format out.

An agent, according to the first preferred embodiment of the invention, includes a URB translating module and a URB receiving driver. It needs to be stressed that the second USB bus driver is not the first USB bus driver which is in compliance with the standards of the first operation system. Because the first USB bus driver cannot communication with the URB translating module according to the invention, the second USB bus driver is used for replacing the first USB bus driver in communicating with the URB translating module. The second USB bus driver is also in compliance with the standards of the first operation system. The second USB bus driver can be directly obtained by modifying or rewriting the first USB bus driver.

The URB translating module, operating under the first operation system and coupled to the second USB bus driver, is used for receiving the USB request block in the first format transmitted from the second USB bus driver, for translating the USB request block in the first format into a USB request block in a second format native to the second operation system in accordance with an algorithm, and for transmitting the USB request block in the second format out. The URB receiving driver, operating under the second operation system, is used for receiving the USB request block in the second format transmitted from the URB translating module. The USB host controlling driver, operating under the second operation system and coupled to the USB device, is used for receiving the USB request block in the second format transmitted from the URB receiving driver and for controlling the USB device in accordance with the USB request block in the second format.

Another scope of the invention is to provide a controlling method for assisting an application in controlling a USB device. The application is executed in a processing platform where a first operation system is installed. The USB device is plugged in a second operation system rather than the first operation system. The processing platform includes a USB device driver and a second USB bus driver. The USB device driver is coupled to the application, whereas the second USB bus driver is coupled to the USB device driver. The USB device driver creates, in response to a request from the application, a USB request block in a first format. The second USB bus driver receives the USB request block in the first format created by the USB device driver and transmits the USB request block in the first format out.

A controlling method, according to the second preferred embodiment of the invention, includes the following steps. First, under the first operation system, the method is used for translating the USB request block in the first format, received from the second USB bus driver, into a USB request block in the second format in accordance with an algorithm, and then it transmits the USB request block in the second format out. Next, the method is used, under the second operation system, for receiving the USB request block in the second format and for controlling the USB device in accordance with the USB request block in the second format.

Another scope of the invention is to provide a computer program product including a storage medium having a computer program embedded inside. The computer program, executed in a processing platform where a first operation system is installed, is used for causing an application to control a USB device. The USB device is plugged in a second operation system rather than the first operation system. The processing platform includes a USB device driver and a second USB bus driver. The USB device driver is coupled to the application, whereas the second USB bus driver is coupled to the USB device driver. The USB device driver creates, in response to a request from the application, a USB request block in a first format. The second USB bus driver receives the USB request block in the first format created by the USB device driver and transmits the USB request block in the first format out.

A computer program product, according to the third preferred embodiment of the invention, includes a second USB bus driver and a URB translating module. The URB translating module, operating under the first operation system and coupled to the second USB bus driver, is used for receiving the USB request block in the first format transmitted from the second USB bus driver; it is also used for translating the USB request block into one in a second format native to the second operation system in accordance with an algorithm and for transmitting the USB request block in the second format out. Moreover, an embedded system in the USB device includes the second operation system, a URB receiving driver, and a USB host controlling driver. The URB receiving driver, operating under the second operation system, is used for receiving the USB request block in the second format transmitted from the URB translating module. The USB host controlling module, operating under the second operation system and coupled to the USB device, is used for receiving the USB request block in the second format transmitted from the USB receiving driver and for controlling the USB device in accordance with the USB request block in the second format.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
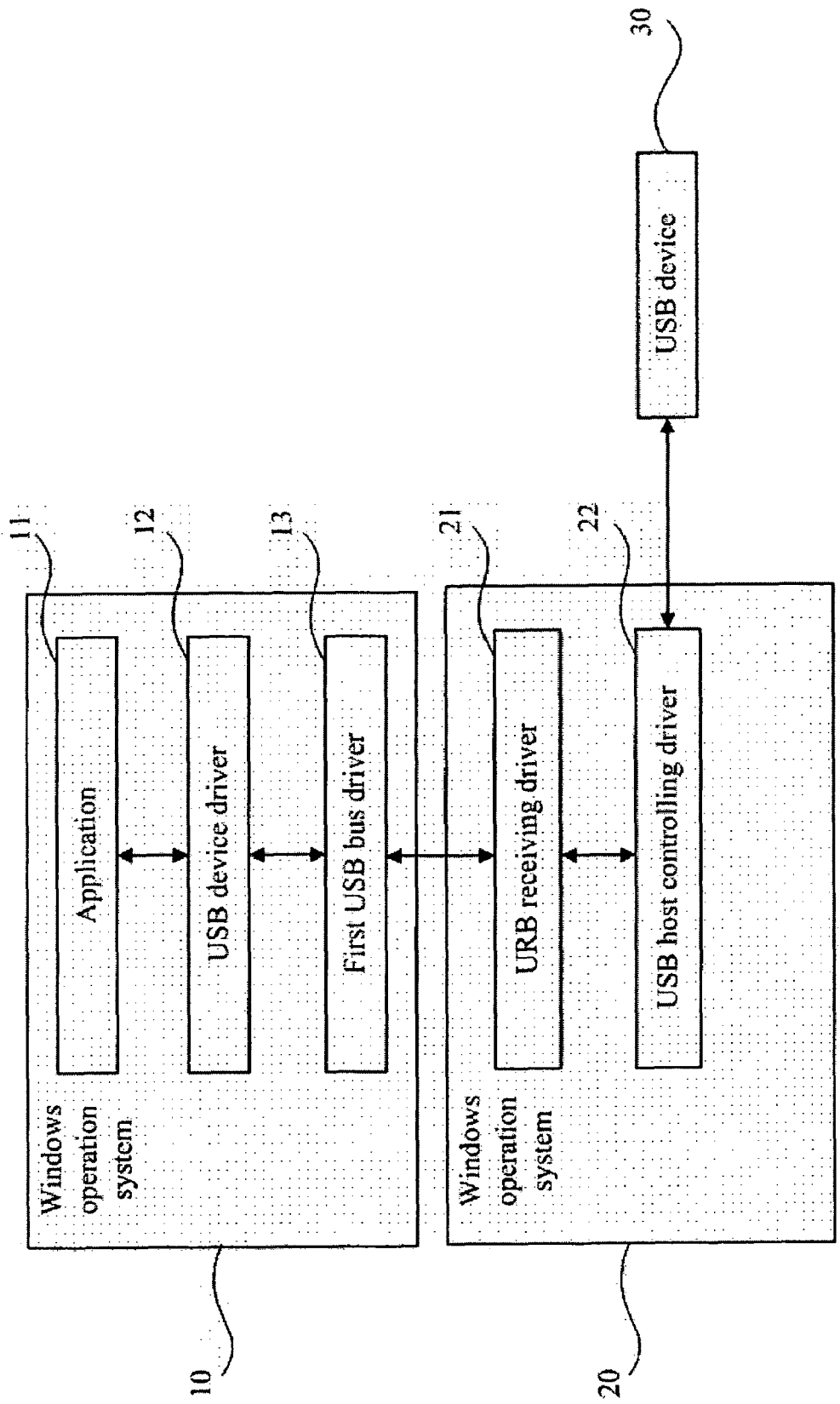
FIG. 1 is a functional block diagram showing an essential component for controlling a USB by an application.
Figure 2:
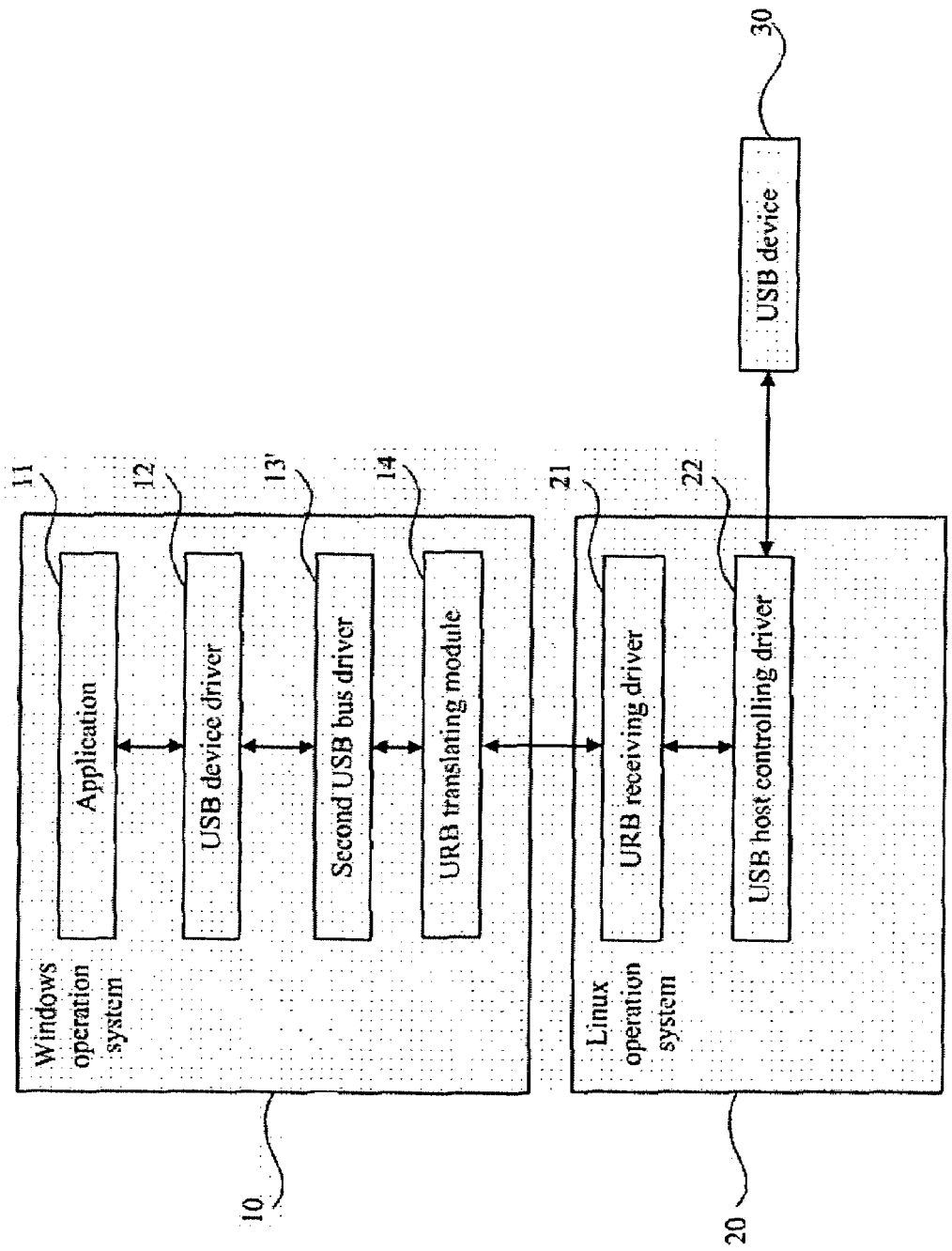
FIG. 2 is a functional block diagram showing an agent assisting an application in controlling a USB device by an essential component according to the first preferred embodiment of the invention.

Referring to FIG. 2, FIG. 2 is a functional block diagram showing an agent assisting an application in controlling a USB device by an essential component according to the first preferred embodiment of the invention.

As shown in FIG. 2, the application 11 is executed in a processing platform where a first operation system 10 is installed. The USB device 30 is plugged in a second operation system 20 rather than the first operation system 10. A Windows operation system is used as an example for the first operation system 10, and a Linux operation system is used as an example for the second operation system 20.

The processing platform includes a USB device driver 12 and a second USB bus driver 13'. The USB device driver 12 is coupled to the application 11, whereas the second USB bus driver 13' is coupled to the USB device driver 12. The USB device driver 12 creates, in response to a request from the application 11, a USB request block in a first format. The second USB bus driver 13' receives the USB request block in the first format from the USB device driver 12 and transmits the USB request block in the first format out.

An agent, according to the first preferred embodiment of the invention, includes a URB translating module 14 and a URB receiving driver 21. It needs to be stressed that the second USB bus driver 13' described above is not the first USB bus driver 13 in compliance with the standards of first operation system 10. Because the first USB bus driver 13 cannot communicate with the URB translating module 14 according to the invention, the second USB bus driver 13' is used for replacing the first USB bus driver 13 in communicating with URB translating module 14. The second bus driver 13' is in compliance with the standards of the first operation system 10. The second USB bus driver 13' can be directly obtained by modifying or rewriting the first USB bus driver 13.

The URB translating module 14, operating under the first operating system 10 and coupled to the second USB bus driver 13', is used for receiving the USB request block in the first format transmitted from the second USB bus driver 13', for translating the USB request block in the first format into the USB request block in a second format native to the second operation system in accordance with an algorithm, and for transmitting the USB request block in the second format out.

The URB receiving driver 21, operating under the second operation system 20, is used for receiving the USB request block in the second format transmitted from the URB translating module 14.

The USB host controlling device 22, operating under the second operation system 20 and coupled to the USB device 30, is used for receiving the USB request block in the second format transmitted from the URB receiving driver 21 and for controlling the USB device 30 in accordance with the USB request block in the second format.

In one embodiment of the invention, the URB receiving driver 21, the USB host controlling driver 22, and the second operation system 20 are implemented into an embedded system in the USB device 30. For example, the URB receiving driver 21, the USB host controlling driver 22, and the second operation system 20, such as the Linux operation system, are implemented into an embedded system in a chip installed in a smart phone. The smart phone can be connected to a first operation system, such as the Windows operation system.

In one embodiment of the invention, the algorithm according to the URB translating module 14 includes the following steps. First, the transfer type of the USB request block, in the first format is judged to see if it is a control type, and if yes, a control type translation is performed; if no, the next step is performed. Next, the transfer type of the USB request block in the first format is judged to see if it is a bulk type, and if yes, a bulk type translation is performed; if no, the next step is performed. Next, the transfer type of the USB request block in the first format is judged to see if it is an interrupt type, and if yes, an interrupt type translation is performed; if no, the next step is performed. Finally, the transfer type of the USB request block in the first format is judged to see if it is an isochronous type, if yes, an isochronous type translation is performed.

A control type translation, for example, includes the following steps.

First, the *dev column of the USB request block in the second format is set to point to the USB device. The indicator in the second system is determined in accordance with a device number and a USB bus number of the USB device in a physical device object (PDO) stored in the first operation system. When the USB device is connected to the second operation system, the device number, the USB bus number, and a USB device descriptor of the USB device are transmitted under the second operation system to the PDO of the first operation system for storage. The PDO corresponds to the USB device.

Next, the value of the transfer_flags column of the USB request block in the second format is set as 0.

Next, a pipe column of the USB request block in the second format is set. The pipe column has the device number, a transfer direction, an endpoint number, and a transfer type. The device number is obtained from the PDO of the first operation system. The transfer direction is determined in accordance with the USBD_TRANSFER_DIRECTION_IN bit of the TransFlags column of the USB request block in the first format. Alternatively, if the USB request block in the first format does not have the TransFlags column, the transfer direction is set in accordance with the purpose of the USB request block in the first format, and the endpoint number is set as 0.

Next, the value of the transfer_buffer_length column of the USB request block in the second format is set in the same value as the TransferBufferLength column of the USB request block in the first format. Furthermore, if the USB request block in the first format does not have the TransferBufferLength column, then the value of the transfer_buffer_length column is set as 0.

Next, the value of the *transfer_buffer column of the USB request block in the second format is set, and the value of the column in the second operation system is appointed. The transfer direction is judged to see if it is from the first operation system to the second operation system, and if yes, the data pointed by the *transfer_buffer column of the USB request block in the second format in the buffer is replicated in the buffer pointed by the TransferBuffer column of the USB request block in the first format, assuming that the TransferBuffer column is not blank. If no, the data is replicated in the buffer pointed by the TransferBufferMDL column of the USB request block in the first format, assuming that the TransferBuffer column is blank. The replication size is the same as the value of the TransferBufferLength column of the USB request block in the first format.

Next, the *setup_packet column of the USB request block in the second format is set in accordance with the purpose and the associated columns of the USB request block in the first format. The correct USB device requirements are selected in accordance with the USB control type translations in the USB specifications. The bRequestType column, bRequest column, wValue column, wIndex column, and wLength column are set to fill in the *setup_packet column in accordance with the USB device requirements.

Finally, the value of the *context column and the value of the complete column of the USB request block in the second format are set.

A bulk type translation, for example, includes the following steps.

First, the *dev column of the USB request block in the second format is set to point to the USB device. The indicator in the second operation system is appointed in accordance with a device number and a USB bus number of the USB device in a PDO stored in the first operation system. When the USB device is connected to the second operation system, the device number, the USB bus number, and a device descriptor of the USB device are transmitted under the second operation system to the PDO of the first operation system for storage. The PDO corresponds to the USB device.

Next, the value of the transfer_flags column of the USB request block in the second format is set as 0.

Next, the value of a pipe column of the USB request block in the second format is set. The pipe column has the device number, a transfer direction, an endpoint number, and a transfer type. The device number is obtained from the PDO of the first operation system. The transfer direction and the endpoint number are determined in accordance with the PipeHandle column of the USB request block in the first format. When the USB device driver selects configuration, the endpoint number and the endpoint direction are stored in the PipeHandle column, and the transfer direction and the endpoint direction are set as the same.

Next, the value of the transfer_buffer_length column of the USB request block in the second format is set as the same value as the TransferBufferLength column of the USB request block in the first format.

Next, the value of the *transfer_buffer column of the USB request block in the second format is set, and the value of the column in the second operation system is appointed. The transfer direction is judged to see if it is from the first operation system to the second operation system, and if yes, the data pointed by the *transfer_buffer column of the USB request block in the second format in the buffer is replicated in the buffer pointed by the TransferBuffer column of the USB request block in the first format, assuming that the TransferBuffer column is not blank. If no, the data is replicated in the buffer pointed by the TransferBufferMDL of the USB request block in the firstformat, assuming that the TransferBuffer column is blank. The replication size is same as the value of the TransferBufferLength column of the USB request block in the first format.

Finally, the value of the *context column and the value of the complete column of the USB request block in the second format are set.

An interrupt type translation, for example, includes the following steps.

First, the *dev column of the USB request block in the second format is set to point to the USB device. The indicator of the second operation system is pointed in accordance with a device number and a USB bus number of the USB device in a PDO stored in the first operation system. When the USB device is connected to the second operation system, the device number, the USB bus number, and a device descriptor of the USB device are transmitted under the second operation system to the PDO of the first operation system for storage. The PDO corresponds to the USB device.

Next, the value of the transfer_flags column of the USB request block in the second format is set as 0.

Next, the value of a pipe column of the USB request block in the second format is set. The pipe column has the device number, a transfer direction, an endpoint number, and a transfer type. The device number is obtained from the PDO of the first operation system. The transfer direction and the endpoint number are determined in accordance with the PipeHandle column of the USB request block in the first format. When the USB device driver selects configuration, the transfer direction, the endpoint number, and the endpoint direction are stored in the PipeHandle column, and the transfer direction and the endpoint direction are set as the same.

Next, the value of the transfer_buffer_length column of the USB request block in the second format is set as the same value as the TransferBufferLength column of the USB request block in the first format.

Next, the value of the *transfer_buffer column of the USB request block in the second format is set, and the value of the column in the second operation system is appointed. The transfer direction is judged to see if it is from the first operation system to the second operation system, and if yes, the data pointed by the *transfer_buffer column of the USB request block in the second format in the buffer is replicated in the buffer pointed by the TransferBuffer column of the USB request block in the first format, assuming that the TransferBuffer column is not blank. If no, the data is replicated in the buffer pointed by the TransferBufferMDL of the USB request block in the first block, assuming that the TransferBuffer column is blank. The replication size is set as the same value as the TransferBufferLength column of the USB request block in the first format.

Next, the value of the interval column of the USB request block in the second format is set in accordance with the value of the binterval column of the USB device endpoint descriptor. The USB device endpoint descriptor is stored in the PDO of the first operation system.

Next, the value of the start_frame column of the USB request block in the second format is set as −1.

Finally, the value of the *context column and the value of the complete column of the USB request block in the second format are set.

An isochronous type translation, for example, includes the following steps.

First, the *dev column of the USB request block in the second format is set to point to the USB device. The indicator of the second operation system is pointed in accordance with a device number and a USB bus number of the USB device in a PDO stored in the first operation system. When the USB device is connected to the second operation system, the device number, the USB bus number, and a device descriptor of the USB device are transmitted under the second operation system to the PDO of the first operation system for storage. The PDO corresponds to the USB device.

Next, if the USBD_START_ISO_TRANSFER_ASAP flag of the TransferFlags column of the USB request block in the first format is enabled, the ISO ASAP flag of the TransferFlags column of the USB request block in the second format is set, so that it is enabled.

Next, the value of a pipe column of the USB request block in the second format is set. The pipe column has the device number, a transfer direction, an endpoint number, and a transfer type. The device number is obtained from the PDO of the first operation system. The transfer direction and the endpoint number are determined in accordance with the PipeHandle column of the USB request block in the first format. When the USB device driver selects configuration, the endpoint number and the endpoint direction are stored in the PipeHandle column, and the transfer direction and the endpoint direction are set as the same.

Next, the value of the transfer_buffer_length column of the USB request block in the second format is set as the value of the TransferBufferLength column of the USB request block in the first format.

Next, the value of the *transfer_buffer column of the USB request block in the second format is set, and the value of the column in the second operation system is appointed. The transfer direction is judged to see if it is from the first operation system to the second operation system, and if yes, the data pointed by the *transfer_buffer column of the USB request block in the second format in the buffer is replicated in the buffer pointed by the TransferBuffer column of the USB request block in the first format, assuming that the TransferBuffer column is not blank. If no, the data is replicated in the buffer pointed by the TransferBufferMDL of the USB request block in the first format, assuming that the TransferBuffer column is blank. The replication size is same as the value of the TransferBufferLength column of the USB request block in the first format.

Next, the value of the interval column of the USB request block in the second format is set in accordance with the value of the binterval column of the USB device endpoint descriptor. The USB device endpoint descriptor is stored in the PDO of the first operation system.

Next, the value of the start_frame column of the USB request block in the second format is set as the same as the value of the StartFrame column of the USB request block in the first format.

Next, the value of the Number_of_packets column of the USB request block in the second format is set as the value of the NumberOfPackets column of the USB request block in the first format.

Next, the value of the iso_frame_desc[0] column of the USB request block in the second format is set in accordance with the array of the ISOPACKET[ ] column of the USB request block in the first format.

Finally, the value of the *context column and the value of the complete column of the USB request block in the second format are set.

Figure 3:
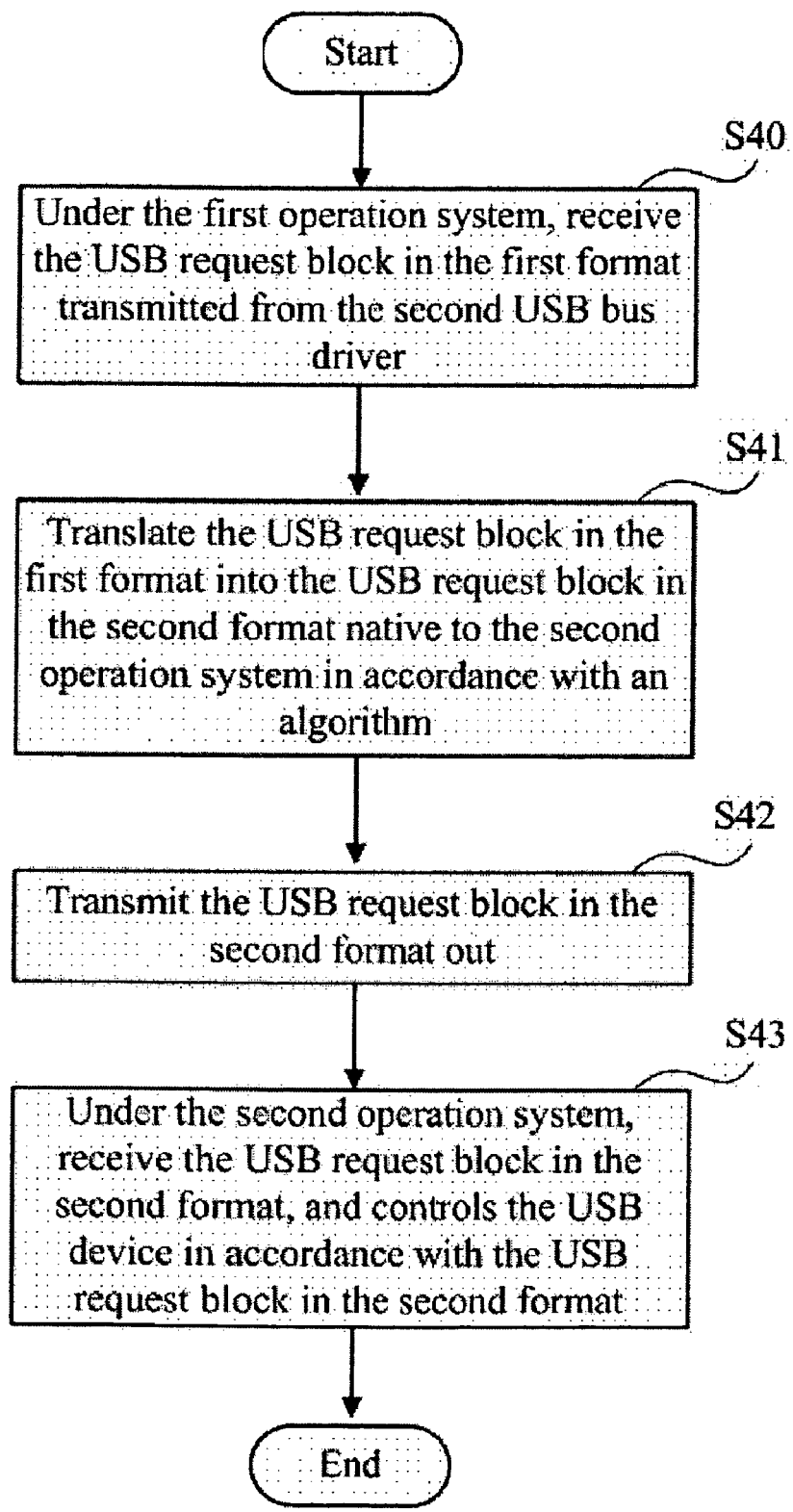
FIG. 3 is a flowchart diagram outlining a controlling method for assisting an application in controlling a UBS device according to the second preferred embodiment of the invention.

Referring to FIG. 3, FIG. 3 is a flowchart diagram outlining a controlling method for assisting an application in controlling a UBS device according to the second preferred embodiment of the invention.

The application is executed in a processing platform where a first operation system is installed. The USB device is plugged in a second operation system rather than the first operation system. The processing platform includes a USB device driver and a second USB bus driver. The USB device driver is coupled to the application, whereas the second USB bus driver is coupled to the USB device driver. The USB device driver creates, in response to a request from the application, a USB request block in a first format. The second USB bus driver receives the USB request block in the first format created by the USB device driver and transmits the USB request block in the first format out.

As shown in FIG. 3, the step S40 in the controlling method for assisting an application in controlling a USB device, in accordance with the second preferred embodiment of the invention, is first performed to receive, under the first operation system, the USB request block in the first format transmitted from the second USB bus driver.

Next, the step S41 in the method, according to the invention, is performed for translating the USB request block in the first format into the USB request block in the second format native to the second operation system.

Next, the step S42 in the method, in accordance with the invention, is performed for transmitting the USB request block in the second format out.

Finally, the step S43 in the method, according to the invention, is performed for receiving, under the second operation system, the USB request format in the second format and for controlling the USB device in accordance with the USB request block in the second format.

In one embodiment of the invention, the first operation system is a Windows operation system, and the second operation system is a Linux operation system.

In one embodiment of the invention, the algorithm includes the following steps. First, the transfer type of the first USB request block in the first format is judged to see if it is a control type; if yes, a control type translation is performed, and if no, the next step is performed. Next, the transfer type of the USB request block in the first format is judged to see if it is a bulk type; if yes, a bulk type translation is performed, and if no, the next step is performed. Next, the transfer type of the USB request block in the first format is judged to see if it is an interrupt type; if yes, an interrupt type translation is performed, and if no, the next step is performed. Finally, the transfer type of the USB request block in the first format is judged to see if it is an isochronous type, and if yes, an isochronous type translation is performed.

Please refer to the specifications of the first preferred embodiment of the invention for information related to the control type translation, the bulk type translation, the interrupt type translation, and the isochronous type translation.

In a practical application, a personal computer is connected to a server. A Windows operation system is installed in the personal computer, and a Linux operation system is installed in the server. An application, such as a Word processor is executed in the personal computer. A USB device, such as a printer is connected to the server. A user can expect the printer to output a printed material when the application executes a printing instruction.

The Windows operation system includes a USB device driver and a second USB bus driver. The USB device driver is coupled to the application, whereas the second USB bus driver is coupled to the USB device driver. The USB device driver creates, in response to a request from the application, a USB request block in a first format. The USB request block in the first format corresponds to the printing request.

The second USB bus driver receives the USB request block in the first format created by the USB bus driver and transmits the USB request block in the first format out.

Under the Windows operation system, a URB translating module receives the USB request block in the first format transmitted from the second USB bus driver, translates the USB request block in the first format into the USB request block in the second format native to the Linux system according to an algorithm, and transmits the USB request block in the second format out.

Under the Linux operation system, a URB receiving driver receives the USB request block in the second format transmitted from the URB translating module.

A USB host controlling driver, operating under the Linux operation system and coupled to the printer, is used for receiving the USB request block in the second format transmitted from the URB receiving driver and for controlling the printer to perform a printing task in accordance with the USB request block in the second format.

The third preferred embodiment of the invention is a computer program product. The computer program product includes a storage medium having a computer program embedded inside. The computer program is used for causing an application to control a USB device. The application is executed in a processing platform where a first operation system is installed. The USB device is plugged in a second operation system rather than the first operation system. The processing platform includes a USB device driver and a second USB bus driver. The USB device driver is coupled to the application, whereas the second USB bus driver is coupled to the USB device driver. The USB device diver creates, in response to a request from the application, a USB request block in a first format. The second USB bus driver receives the USB request block in the first format created by the USB device driver and transmits the USB request block in the first format out.

The computer program includes a second USB bus driver and a URB translating module. The URB translating module, operating under the first operation system and coupled to the second USB bus driver, is used for receiving the USB request block in the first format transmitted from the second USB bus driver, for translating the USB request block in the first format into the USB request block in a second format native to the second operation system in accordance with an algorithm, and for transmitting the USB request block in the second format out.

Moreover, an embedded system in the USB device includes the second operation system, a URB receiving driver, and a USB host controlling driver.

The URB receiving driver, operating under the second operation system, is used for receiving the USB request block in the second format transmitted from the URB translating module.

The USB host controlling module, operating under the second operation system and coupled to the USB device, is used for receiving the USB request block in the second format transmitted from the URB receiving driver and for controlling the USB device in accordance with the USB request block in the second format.

In one embodiment of the invention, the first operation system is a Windows operation system, and the second operation system is a Linux system.

In one embodiment of the invention, the algorithm includes the following steps. First, the transfer type of the first USB request block in the first format is judged to see if it is a control type; if yes, a control type translation is performed, and if no, the next step is performed. Second, the transfer type of the USB request block in the first format is judged to see if it is a bulk type; if yes, a bulk type translation is performed, and if no, the next step is performed. Third, the transfer type of the USB request block in the first format is judged to see if it is an interrupt type; if yes, an interrupt type translation is performed, and if no, the next step is performed. Finally, the transfer type of the USB request block in the first format is judged to see if it is an isochronous type, and if yes, an isochronous type translation is performed.

Please refer to the specifications of the first preferred embodiment of the invention for information related to the control type translation, the bulk type translation, the interrupt type translation, and the isochronous type translation.

In a practical application, the URB translating module and the second USB bus driver are implemented into a computer program embedded in a storage medium, such as a compact disc. The computer program can be installed in a first operation system, such as the platform of a Windows operation system.

A second operation system, such as a Linux system, a URB receiving driver, and a USB host controlling driver, are implemented as an embedded system in a chip installed in a smart phone connectible with the Windows operation system.

An application associated with the smart phone is installed in the Windows operation system. A user can have, for example, the request of retrieving a photographic data from the smart phone proceeded through the application.

The Windows operation system includes a USB device driver and a second USB bus driver. The USB device driver is coupled to the application, whereas the second USB bus driver is coupled to the USB device driver. The USB device driver creates, in response to a request from the application for retrieving a photographic data from a smart phone, a USB request block in a first format. The USB request block in the first format corresponds to the request for retrieving a photographic data from the smart phone.

The second USB bus driver receives the USB request block in the first format created by the USB device driver and transmits the USB request block in the first format out.

Under the Windows operation system, the URB translating module receives the USB request block in the first format transmitted from the second USB bus driver, translates the USB request block in the first format into the USB request block in the second format native to the Linux system, and transmits the USB request block in the second format out.

Under the Linux operation system, a URB receiving driver receives the USB request block in the second format transmitted from the URB translating module.

A USB host controlling driver, operating under the Linux operation system and coupled to the smart phone, is used for receiving the USB request block in the second format from the URB receiving driver and for controlling the smart phone to perform the request of retrieving a photographic data from the smart phone in accordance with the USB request block in the second format.

Obviously, the invention uses a second USB device driver and a URB translating module installed in the first operation system for assisting an application in the first operation system in controlling a USB device, which is plugged in a second operation system rather than the first operation system. Therefore, the invention can resolve the problem of the request from the application not being native to the second operation system. Furthermore, the invention also provides a concise operation system installed in a USB device, such as a Linux operation system, and in another operation system, such as a solution for the operation of the USB device from an application of a Windows operation system.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An agent for assisting an application executed in a processing platform where a first operation system is installed, in controlling a USB (Universal serial bus) device plugged in a second operation system rather than the first operation system, the processing platform comprising a USB device driver and a second USB bus driver, the USB device driver being coupled to the application, the second USB bus driver being coupled to the USB device driver, the USB device driver creating, responsive to a request from the application, a USB request block (URB) in a first format, the second USB bus driver receiving the USB request block in the first format from the USB device driver, and transmitting the USB request block in the first format out, said agent comprising:

a URB translating module, operating under the first operation system and coupled to the USB bus driver, for receiving the USB request block in the first format transmitted from the second USB bus driver, translating the USB request block in the first format into the USB request block in a second format native to the second operation system in accordance with an algorithm, and transmitting the USB request block in the second format out; and a URB receiving driver, operating under the second operation system, for receiving the USB request block in the second format transmitted from the URB translating module, wherein the algorithm is configured to comprise judging if the transfer type of the USB request block in the first format is a specific type, and if yes, performing a specific type translation corresponding to the specific type.

2. The agent of claim 1, wherein the URB receiving driver, the USB host controlling driver, and the second operation system are implemented into an embedded system in the USB device.

3. The agent of claim 1, wherein the first operation system is a Windows operation system, and the second operation system is a Linux operation system.

4. The agent of claim 1, wherein the specific type is one of a control type, a bulk type, an interrupt type, or an isochronous type, the algorithm being further configured such that if the specific type is the control type, the specific type translation will be a control type translation corresponding to the control type;

if the specific type is the bulk type, the specific type translation will be a bulk type translation corresponding to the bulk type;

if the specific type is the interrupt type, the specific type translation will be an interrupt type translation corresponding to the interrupt type; and if the specific type is the isochronous type, the specific type translation will be an isochronous type translation corresponding to the isochronous type.

5. A method for assisting an application executed in a processing platform where a first operation system is installed, in controlling a USB (Universal serial bus) device plugged in a second operation system rather than the first operation system, the processing platform comprising a USB device driver and a second USB bus driver, the USB device driver being coupled to the application, the second USB bus driver being coupled to the USB device driver, the USB device driver creating, responsive to a request from the application, a USB request block (URB) in a first format, the second USB bus driver receiving the USB request block in the first format from the USB device driver, and transmitting the USB request block in the first format out, said method comprising the steps of:

under the first operation system, receiving the USB request block in the first format transmitted from the second USB Bus driver, translating the USB request block in the first format into the USB request block in a second format native to the second operation system in accordance with an algorithm, and transmitting the USB request block in the second format out; and under the second operation system, receiving the USB request block in the second format, and controlling the USB device in accordance with the USB request block in the second format, wherein the algorithm comprises judging if the transfer type of the USB request block in the first format is a specific type, and if yes, performing a specific type translation corresponding to the specific type.

6. The method of claim 5, wherein the first operation system is a Windows operation system, and the second operation system is a Linux operation system.

7. The method of claim 5, wherein the specific type is one of a control type, a bulk type, an interrupt type, or an isochronous type, the algorithm further including if the specific type is the control type, the specific type translation will be a control type translation corresponding to the control type;

if the specific type is the bulk type, the specific type translation will be a bulk type translation corresponding to the bulk type;

if the specific type is the interrupt type, the specific type translation will be an interrupt type translation corresponding to the interrupt type; and if the specific type is the isochronous type, the specific type translation will be an isochronous type translation corresponding to the isochronous type.

8. A computer program product comprising a storage medium, having a computer program embedded in which, for causing an application, executed in a processing platform where a first operation system is installed, to control a USB (Universal serial bus) device compatible with a second operation system rather than the first operation system, the processing platform comprising a USB device driver and a second USB bus driver, the USB device driver being coupled to the application, the second USB bus driver being coupled to the USB device driver, the USB device driver creating, responsive to a request from the application, a USB request block (URB) in a first format, the second USB bus driver receiving the USB request block in the first format from the USB device driver, and transmitting the USB request block in the first format out, the computer program comprising:

- a URB translating module, operating under the first operation system and coupled to the second USB bus driver, for receiving the USB request block in the first format transmitted from the second USB Bus driver, translating the USB request block in the first format into the USB request block in a second format native to the second operation system in accordance with an algorithm, and transmitting the USB request block in the second format out;
- wherein an embedded system in the USB device comprises:
- the second operation system;
- a URB receiving driver, operating under the second operation system, for receiving the USB request block in the second format transmitted from the URB translating module; and
- a USB host controlling driver, operating under the second operation system and coupled to the USB device, for receiving the USB request blocks in the second format from the URB receiving driver, and controlling the USB device in accordance with the USB request block in the second format,
- wherein the algorithm is configured to comprise judging if the transfer type of the USB request block in the first format is a specific type, and if yes, performing a specific type translation corresponding to the specific type.

9. The computer program product of claim 8, wherein the first operation system is a Windows operation system, and the second operation system is a Linux operation system.

10. The computer program product of claim 8, wherein the specific type is a control type, a bulk type, an interrupt type, or an isochronous type, the algorithm being further configured such that

- if the specific type is the control type, the specific type translation will be a control type translation corresponding to the control type;
- if the specific type is the bulk type, the specific type translation will be a bulk type translation corresponding to the bulk type;
- if the specific type is the interrupt type, the specific type translation will be an interrupt type translation corresponding to the interrupt type; and
- if the specific type is the isochronous type, the specific type translation will be an isochronous type translation corresponding to the isochronous type.

* * * * *